United States Patent
Huang et al.

(10) Patent No.: US 8,325,421 B2
(45) Date of Patent: Dec. 4, 2012

(54) ZOOM PROJECTION LENS

(75) Inventors: Hai-Jo Huang, Taipei Hsien (TW);
Fang-Ying Peng, Taipei Hsien (TW);
Sheng-An Wang, Taipei Hsien (TW);
Xiao-Na Liu, Guangdong (CN)

(73) Assignees: Premier Image Technology(China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 232 days.

(21) Appl. No.: 12/955,914

(22) Filed: Nov. 30, 2010

(65) Prior Publication Data
US 2012/0105972 A1   May 3, 2012

(30) Foreign Application Priority Data
Oct. 28, 2010   (CN) .......................... 2010 1 0523559

(51) Int. Cl.
*G02B 15/14*   (2006.01)
*G02B 9/00*   (2006.01)

(52) U.S. Cl. .................. 359/676; 359/649; 359/683

(58) Field of Classification Search .................. 359/676, 359/680–683, 649
See application file for complete search history.

(56) References Cited

U.S. PATENT DOCUMENTS

| | | | |
|---|---|---|---|
| 6,768,595 B2 * | 7/2004 | Nagahara ....................... 359/683 |
| 7,170,691 B2 * | 1/2007 | Sawamoto ..................... 359/680 |
| 7,522,348 B2 * | 4/2009 | Nagahara ....................... 359/683 |
| 8,085,475 B2 * | 12/2011 | Miyazaki et al. ............. 359/680 |

* cited by examiner

*Primary Examiner* — Jordan Schwartz
(74) *Attorney, Agent, or Firm* — Altis Law Group, Inc.

(57) ABSTRACT

A zoom projection lens includes, in the order from the magnification side to the minification side thereof, a first lens group with negative refraction power, a second lens group with positive refraction power, a third lens group with positive refraction power, a fourth lens group with negative refraction power, and a fifth lens group with positive refraction power. The first lens group, the second lens group, the third lens group, and the fourth lens group are movably positioned. The fifth lens group is immovably positioned. The zoom projection lens satisfying the formulae: $1.0<|F1/Fw|<1.3$; $2.5<|F3/Fw|<2.7$; $2.81<|F5/Fw|<2.83$; and $0.21<|F2/F4|<0.24$, wherein F1-F5 respectively represent the effective focal lengths of the first, second, third, fourth, and fifth lens groups, Fw represents the shortest effective focal length of the zoom projection lens.

13 Claims, 10 Drawing Sheets

ZOOM PROJECTION LENS

BACKGROUND

1. Technical Field

The present disclosure relates to zoom lenses and, particularly, to a zoom projection lens.

2. Description of Related Art

Recently, zoom lenses are used in projectors, such as digital micro-mirror device (DMD) projectors, to allow adjusting the projectors for use in different spaces, e.g., a spacious hall or a narrow room. However, correcting aberrations in the zoom lens is difficult, because corrections for one setting of the zoom lens may not be effective at another setting. Therefore it is difficult to ensure quality image resolution for all settings within a zooming range of the zoom lens.

What is needed, therefore, is a zoom projection lens to overcome the above-described problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

DETAILED DESCRIPTION

Embodiments of the present disclosure will now be described in detail below, with reference to the accompanying drawings.

Figure 1:
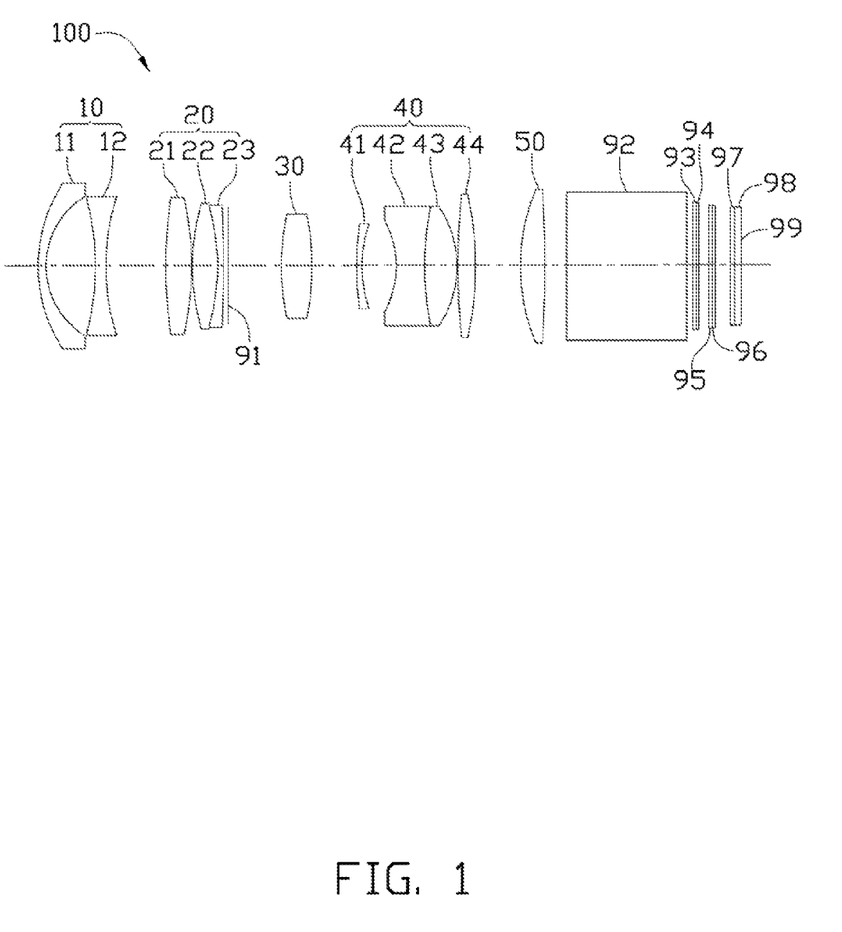
FIG. 1 is a schematic view of a zoom projection lens in a wide angle state according to an exemplary embodiment.
Figure 2:
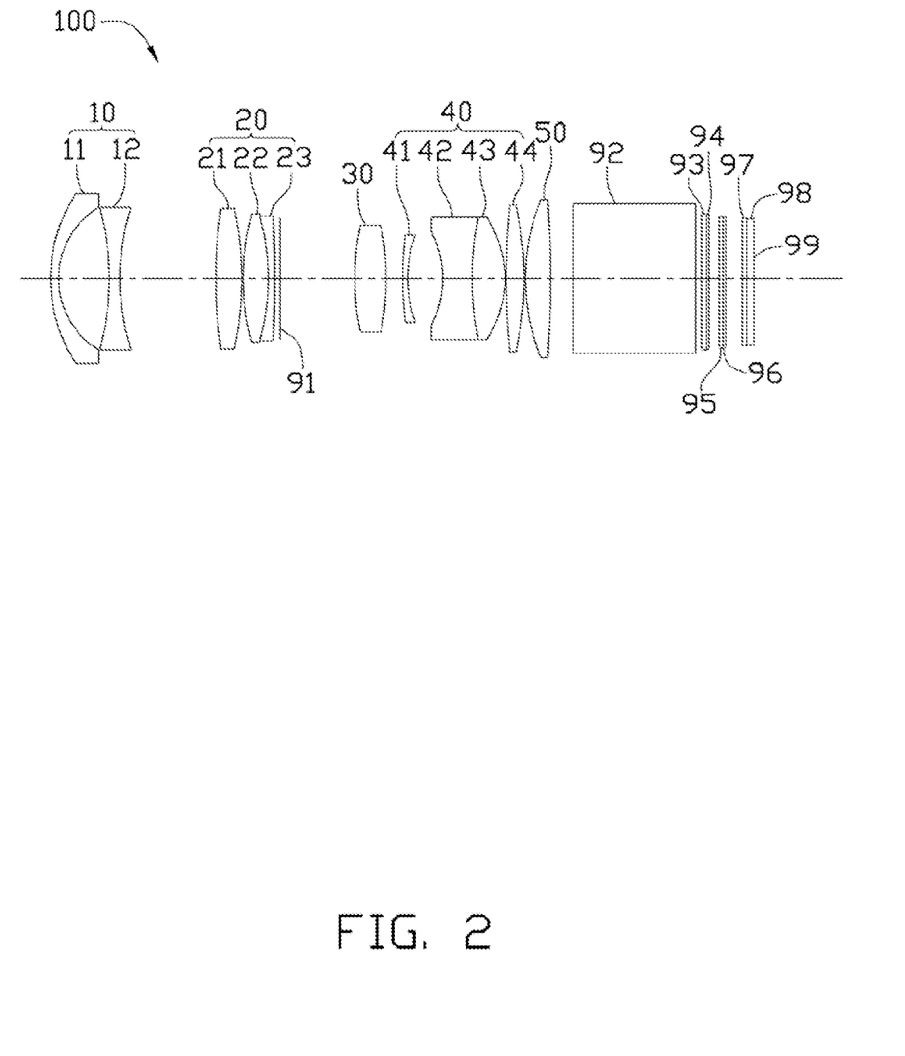
FIG. 2 is a schematic view of the zoom projection lens of FIG. 1 in a telephoto state.

Referring to FIG. 1, a zoom projection lens 100 according to an exemplary embodiment is shown. The half-field angle of the zoom projection lens 100 is not smaller than 29 degrees. The zoom projection lens 100 includes, in order from the magnification side to the minification side thereof, a first lens group 10 with negative refraction power, a second lens group 20 with positive refraction power, a third lens group 30 with positive refraction power, a fourth lens group 40 with negative refraction power, and a fifth lens 50 with positive refraction power. The fifth lens groups 50 is immovably positioned to prevent unwanted contact between a DMD (not shown) and the fourth lens group 40, while the lens groups 10, 20, 30, 40 are movably positioned. Thereby, the effective focal length of the zoom projection lens 100 can be adjusted by moving the lens groups 10, 20, 30, 40 along the optical axis thereof. In particular, uniformity of imaging quality can also be obtained by adjusting positions of the lens groups 10, 20, 30, 40. The first lens group 10 is a focusing lens group.

In the embodiment, the zoom projection lens 100 is configured for utilization in a DMD projector. The DMD, located at a surface 99, modulates light signals for projection through the zoom projection lens 100. The light signals are transmitted through the fifth lens group 50, the fourth lens group 40, the third lens group 30, the second lens group 20, and the first lens group 10 in sequence, and then projected onto a projection surface (not shown) to produce images. In particular, the light signals are transmitted through, in order, a protective glass sheet 98, a fifth flat glass 97, a fourth flat glass 96, a third flat glass 95, a second flat glass 94, a first flat glass 93, a prism 92 and then enters the zoom projection lens 100. Different coatings may be applied to the first~fifth glasses 93, 94, 95, 96, 97, for various purposes such as filtering.

In order to obtain a zoom projection lens 100 with short overall length and low spherical aberration, the zoom projection lens 100 satisfies the following formulas:

$$1.0 < |F1/Fw| < 1.2; \tag{1}$$

$$2.5 < |F3/Fw| < 2.7; \tag{2}$$

$$2.81 < |F5/Fw| < 2.83; \tag{3}$$

$$0.21 < |F2/F4| < 0.24; \tag{4}$$

wherein, Fw represents the shortest effective focal length of the zoom projection lens 100, F1-F4 respectively represent the effective focal lengths of the first, second, third and fourth lens groups 10-40. The formulas (1)-(4) can favorably limit the relation between the focal length of every lens groups and the focal length of the zoom projection lens 100 to obtain a high resolution. In addition, the telecentric characteristic of the zoom projection lens 100 is also maintained.

The first lens group is a focus lens group. Specifically, the first lens group 10 includes, in the order from the magnification side to the minification side of the zoom projection lens 100, a first lens 11 with negative refraction power and a second lens 12 with negative refraction power. In this embodiment, the first lens 11 is an aspherical lens. The first lens 11 can be made of plastic, because the first lens 11 is far away from a heat source of the projector.

The second lens group 20 includes, in the order from the magnification side to the minification side of the zoom projection lens 100, a third lens 21 with positive refraction power, a fourth lens 22 with positive refraction power, and a fifth lens 23 with negative refraction power. In this embodiment, the fourth lens 22 and the fifth lens 23 are adhered together to form a compound lens.

To correct chromatic aberration in the zoom projection lens 100, the zoom projection lens 100 further satisfies the formula:

$$1.6 < (Nd4+Nd5)/2; \tag{5}$$

$$40 < (Vd4-Vd5) < 46; \tag{6}$$

wherein, Nd4 is the refractive index of the fourth lens 22 of d light (wavelength: 587.6 nm), Vd4 is the Abbe number of the fourth lens 22 of d light. Nd5 is the refractive index of the fifth lens 23 of d light, Vd4 is the Abbe number of the fifth lens 23 of d light.

The third lens group 30 serves as a sixth lens with positive refraction power.

The fourth lens group 40 includes, in the order from the magnification side to the minification side of the zoom projection lens 100, a seventh lens 41 with negative refraction power, a eighth lens 42 with negative refraction power, a ninth lens 43 with positive refraction power, and a tenth lens 44 with positive refraction power.

The fifth lens group 50 serves as an eleventh lens with positive refraction power.

Specifically, an aperture stop 91 with an unchangeable aperture is installed between the fifth lens 23 and the third lens group 30. The aperture stop 91 is configured for adjusting light flux from the third lens group 30 to the fifth lens 23. In addition, the aperture stop 91 facilitates uniform light transmission when light passes trough the third lens group 30 to correct coma aberrations of the zoom projection lens 100. To minimize manufacturing costs and the overall length of the zoom projection lens 100, the aperture stop 91 can be obtained by smearing an opaque material on an outer rim of the object side surface of the third lens group 30. The lenses are made of glass except the first lens 11 to resist thermal deformation and to better meet mechanical tolerance requirements.

The above aspherical surfaces are shaped according to the formula:

$$x = \frac{ch^2}{1+\sqrt{1-(k+1)c^2h^2}} + \sum A_i h^i$$

wherein h is a height from the optical axis of the zoom projection lens 100 to the aspherical surface, c is a vertex curvature, k is a conic constant, and Ai is i-th order correction coefficients of the aspheric surfaces.

The following are symbols used in the exemplary embodiment.

F: effective focal length of the zoom projection lens 100;

D4: the distance between the first lens group 10 and the second lens group 20 along the optical axis of the zoom projection lens 100 (the distance between minification side surface of the second lens 12 and the magnification side surface of the third lens 21 along the optical axis of the zoom projection lens 100);

D10: the distance between the second lens group 20 and the third lens group 30 along the optical axis of the zoom projection lens 100 (the distance between minification side surface of the fifth lens 23 and the magnification side surface of the third lens group 30 along the optical axis of the zoom projection lens 100);

D12: the distance between the third lens group 30 and the fourth lens group 40 along the optical axis of the zoom projection lens 100 (the distance between minification side surface of the third lens group 30 and the magnification side surface of the seventh lens 41 along the optical axis of the zoom projection lens 100);

D19: the distance between the fourth lens group 40 and the fifth lens group 50 along the optical axis of the zoom projection lens 100 (the distance between minification side surface of the tenth lens 44 and the magnification side surface of the fifth lens group 50 along the optical axis of the zoom projection lens 100);

$F_{No}$: F number;

R: radius of curvature.

D: distance between two adjacent lens surfaces along the optical axis of the zoom projection lens 100.

Nd: refractive index of lens of d light.

Vd: Abbe constant of d light.

Tables 1-3 show the specifications of an embodiment of the zoom projection lens 100.

TABLE 1

| The state of the zoom projection lens 100 | F | $F_{No}$ | D4 | D10 | D12 | D19 |
|---|---|---|---|---|---|---|
| The wide angle state of the zoom projection lens 100 | 18.2 | 5.2153 | 16.398 | 13.5166 | 2.767 | 0.1684 |
| The telephoto state of the zoom projection lens 100 | 23.49 | 5.9418 | 10.509 | 9.951 | 7.811 | 7.838 |

TABLE 2

| Surface | R (mm) | D (mm) | Nd | Vd |
|---|---|---|---|---|
| Magnification side surface of the first lens 11 | 25.366 | 1.38 | 1.531 | 55.75 |
| Minification side surface of the first lens 11 | 12.695 | 8.695 | — | — |
| Magnification side surface of the second lens 12 | −46.313 | 1.796 | 1.516 | 64.198 |
| Minification side surface of the second lens 12 | 39.849 | D4 (table 1) | — | — |
| Magnification side surface of the third lens 21 | 82.939 | 4.5517 | 1.805 | 25.45 |
| Minification side surface of the third lens 21 | −56.058 | 0.1309 | — | — |
| Magnification side surface of the fourth lens 22 | 40.56 | 4.39599 | 1.48 | 70.44 |
| Minification side surface of the fourth lens 22 (Magnification side surface of the fifth lens 23) | −38.189 | 1.10259 | 1.805 | 25.45 |
| Minification side surface of the fifth lens 23 | −188.675 | 0.1201817 | — | — |
| aperture stop 91 | infinite | D10 (table 1) | — | — |
| Magnification side surface of the third lens group 30 | 45.786 | 5.405 | 1.48 | 70.44 |
| Minification side surface of the third lens group 30 | −46.632 | D12 (table 1) | — | — |
| Magnification side surface of the seventh lens 41 | 58.709 | 0.8968 | 1.698 | 30.05 |
| Minification side surface of the seventh lens 41 | 22.539 | 6.0639 | — | — |

TABLE 2-continued

| Surface | R (mm) | D (mm) | Nd | Vd |
|---|---|---|---|---|
| Magnification side surface of the eighth lens 42 | −16.505 | 4.9438 | 1.846 | 23.78 |
| Minification side surface of the eighth lens 42 (Magnification side surface of the ninth lens 43) | 53.026 | 5.6857 | 1.48 | 70.44 |
| Minification side surface of the ninth lens 43 | −19.096 | 0.1309 | — | — |
| Magnification side surface of the tenth lens 44 | 120.809 | 3.1272 | 1.846 | 23.78 |
| Minification side surface of the tenth lens 44 | −58.9558 | D19 (table 1) | — | — |
| Magnification side surface of the fifth lens group 50 | 35.3928 | 4.319 | 1.603 | 60.64 |
| Minification side surface of the fifth lens group 50 | −239.1936 | 3.85 | — | — |
| Magnification side surface of the prism 92 | infinite | 21 | 1.52 | 64.16 |
| Minification side surface of the prism 92 | infinite | 1.24 | — | — |
| Magnification side surface of the first flat glass 93 | infinite | 0.55 | 1.52 | 68 |
| Minification side surface of the first flat glass 93 (Magnification side surface of the second flat glass 94) | infinite | 0.215 | 1.51 | 68 |
| Minification side surface of the second flat glass 94 | infinite | 1.9 | — | — |
| Magnification side surface of the third flat glass 95 | infinite | 0.5 | 1.458 | 67.82 |
| Minification side surface of the third flat glass 95 (Magnification side surface of the fourth flat glass 96) | infinite | 0.2 | 1.51 | 68 |
| Minification side surface of the fourth flat glass 96 | infinite | 3.087 | — | — |
| Magnification side surface of the fifth flat glass 97 | infinite | 0.7 | 1.458 | 67.82 |
| Minification side surface of the fifth flat glass 97 (Magnification side surface of the protective glass sheet 98) | infinite | 1.2 | 1.51 | 68 |
| Minification side surface of the protective glass sheet 98 (The surface 99) | infinite | — | — | — |

TABLE 3

| Surface | Aspherical coefficient |
|---|---|
| Magnification side surface of the first lens 11 | $K = 0.2002793$; $A4 = -5.951076 \times 10^{-6}$; $A6 = -1.035487 \times 10^{-8}$; $A8 = -2.105335 \times 10^{-11}$; $A10 = -6.272113 \times 10^{-14}$; $A12 = 1.737729 \times 10^{-15}$; $A14 = -3.338993 \times 10^{-18}$; $A16 = -5.721236 \times 10^{-21}$ |
| Minification side surface of the first lens 11 | $K = -0.4183628$; $A4 = -3.529410 \times 10^{-6}$; $A6 = -1.076255 \times 10^{-8}$; $A8 = -1.544430 \times 10^{-10}$; $A10 = -6.120549 \times 10^{-13}$; $A12 = -1.052326 \times 10^{-15}$; $A14 = 1.235331 \times 10^{-16}$; $A16 = -5.397007 \times 10^{-19}$ |

Figure 3:
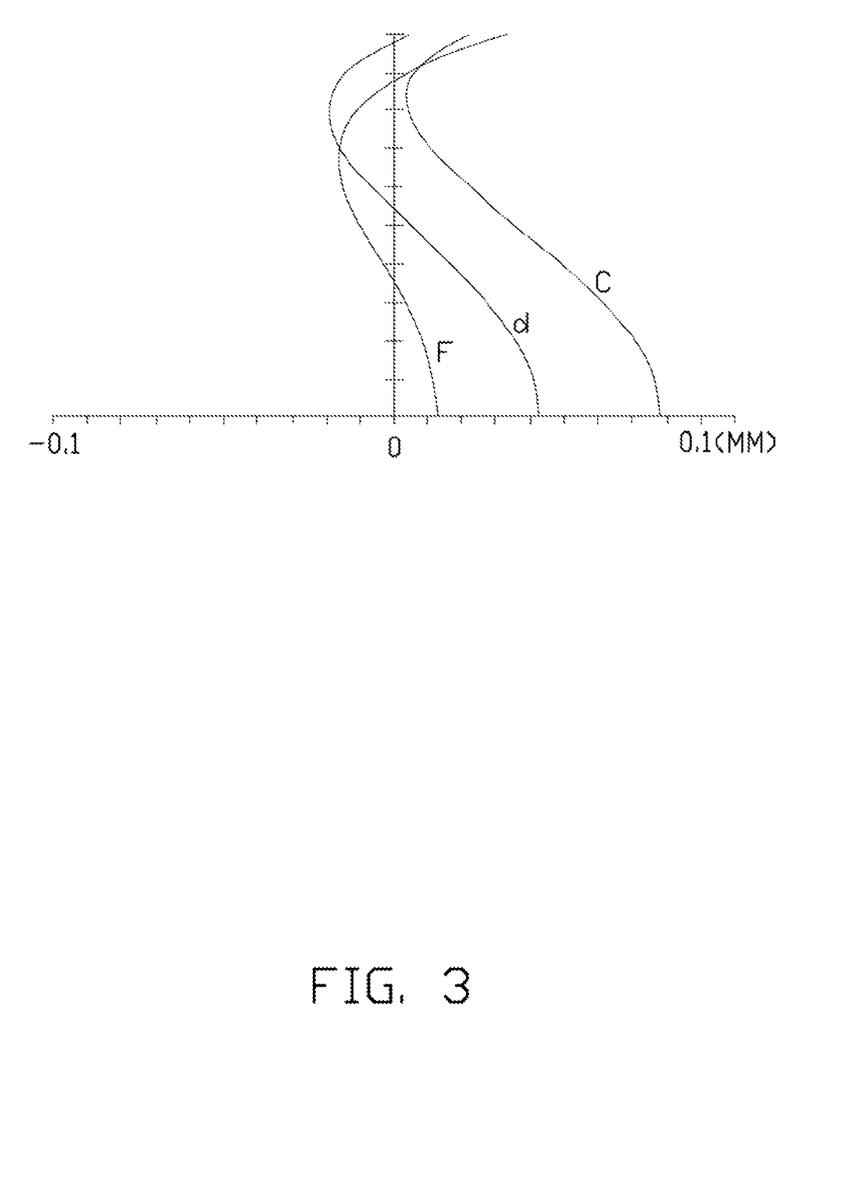
FIGS. 3~6 are graphs respectively showing spherical aberration, field curvature, distortion and lateral chromatic aberration occurring in the zoom projection lens, that is in the wide angle state.
Figure 4:
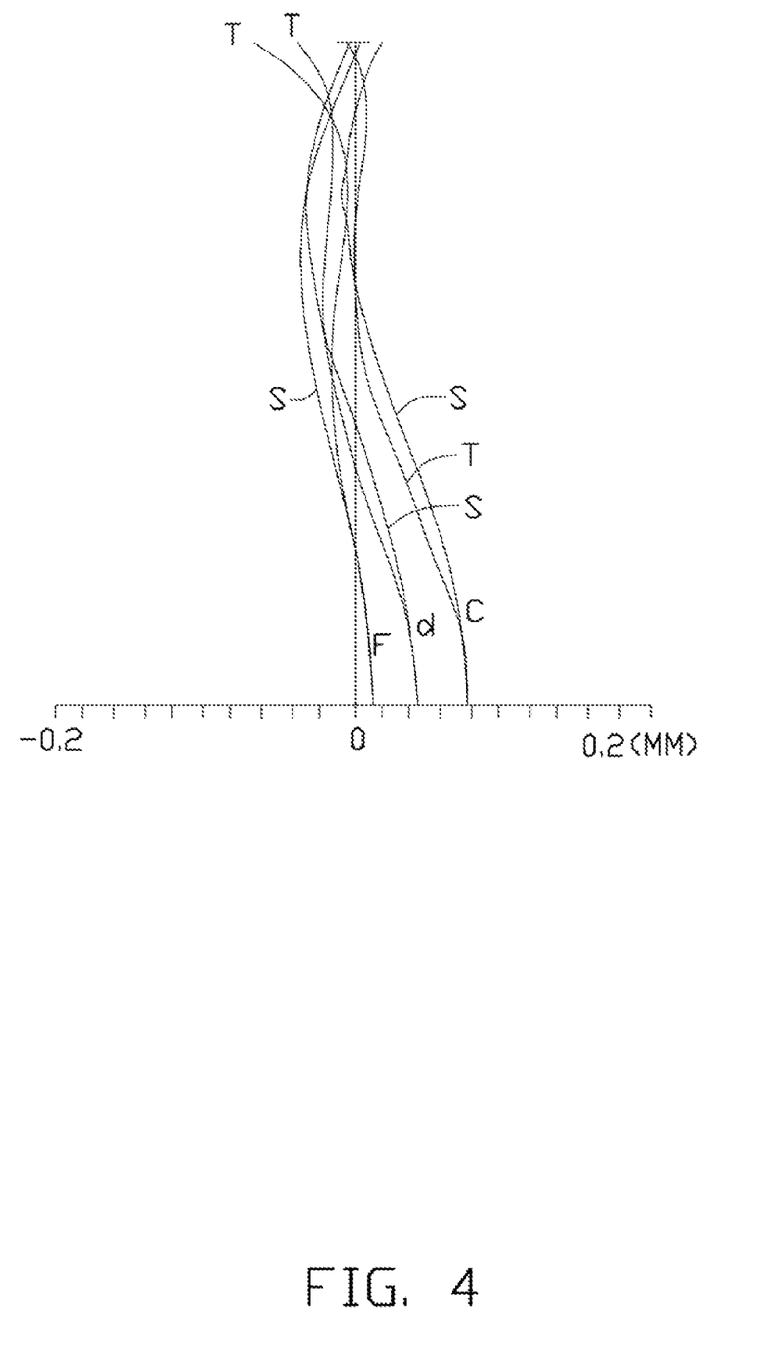
Figure 5:
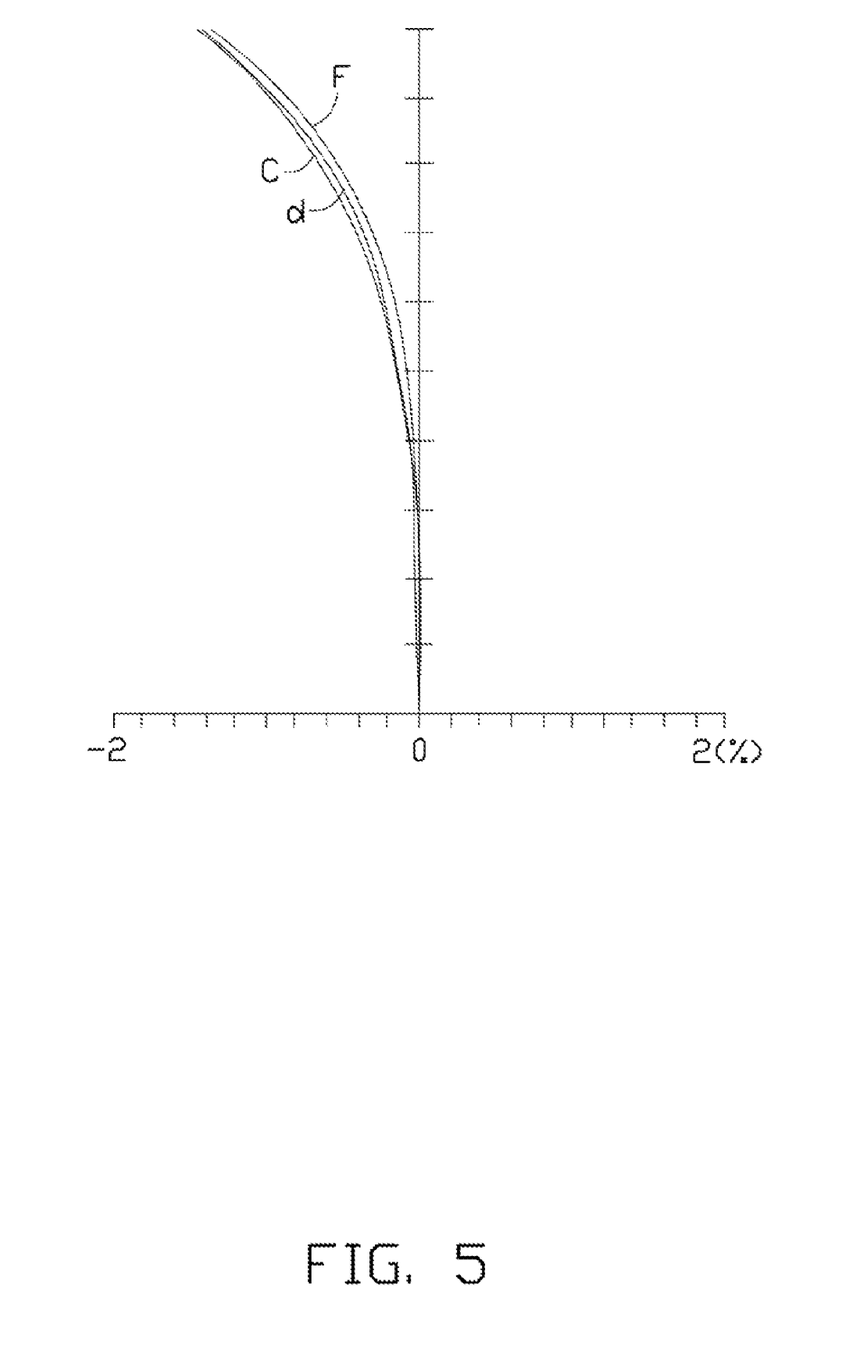
Figure 6:
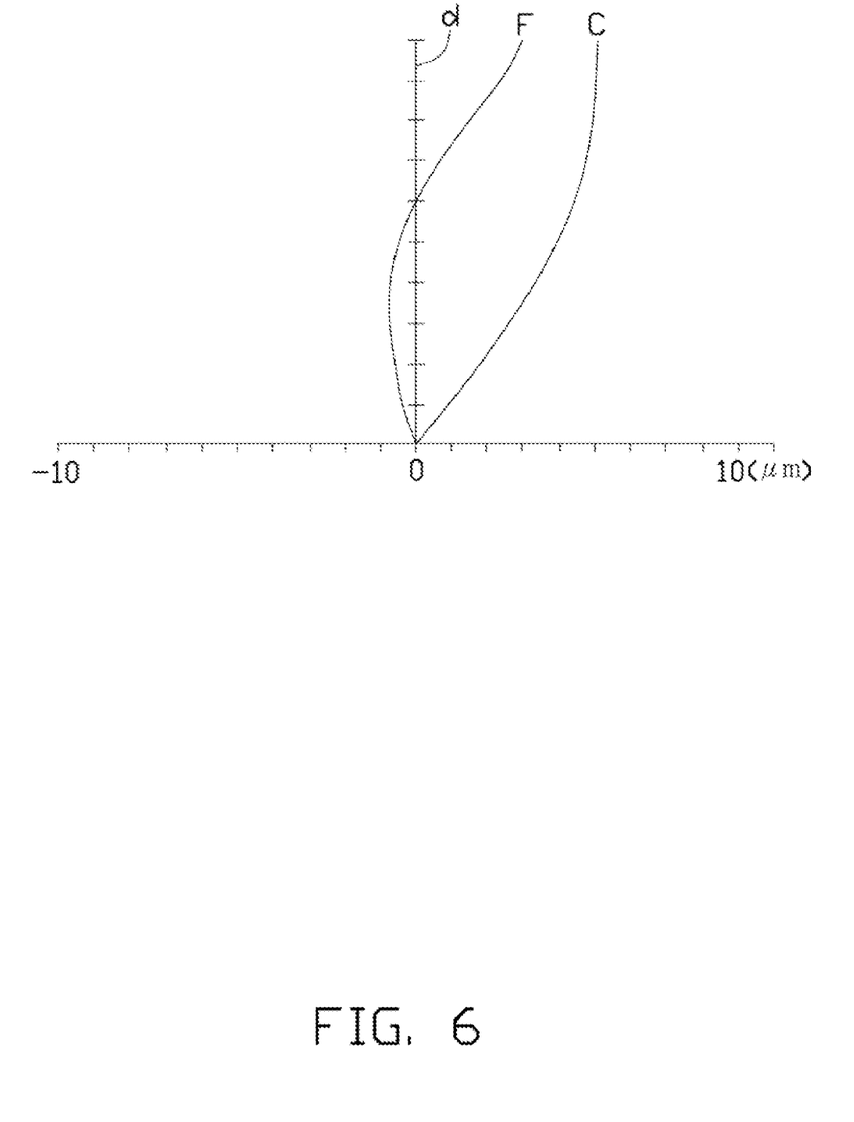
Figure 7:
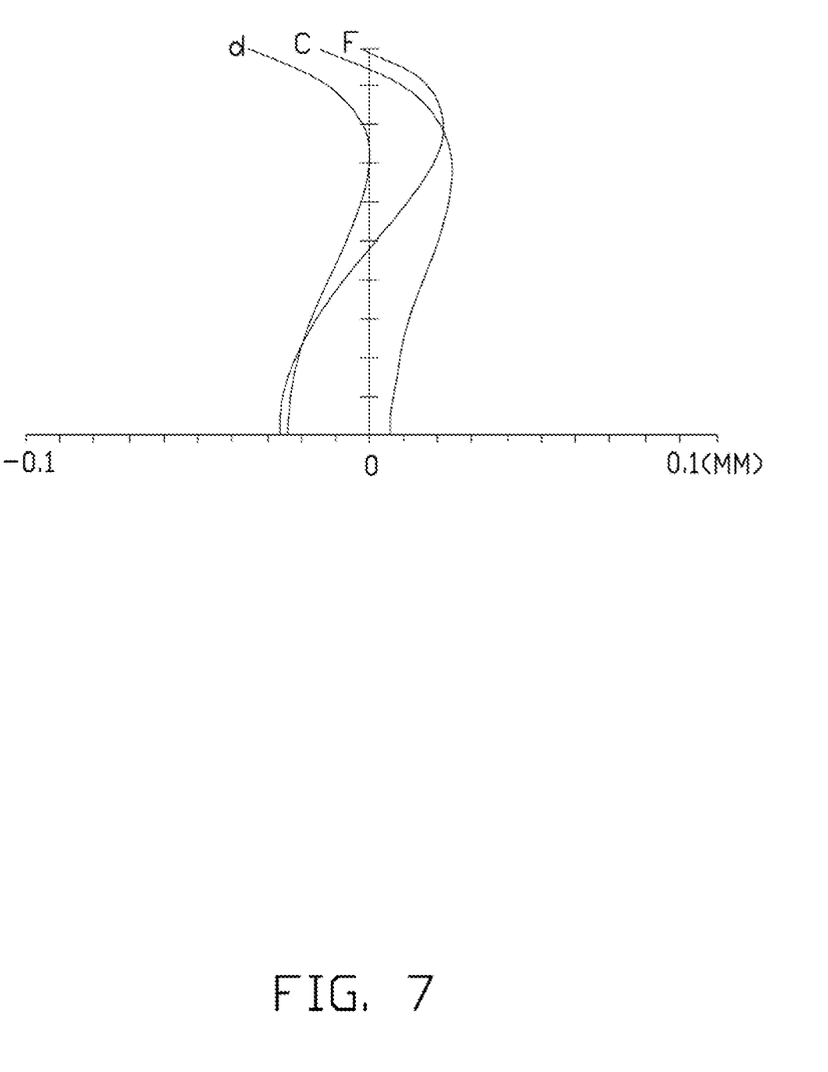
FIGS. 7~10 are graphs respectively showing spherical aberration, field curvature, distortion and lateral chromatic aberration occurring in the zoom projection lens, that is in the telephoto state.
Figure 8:
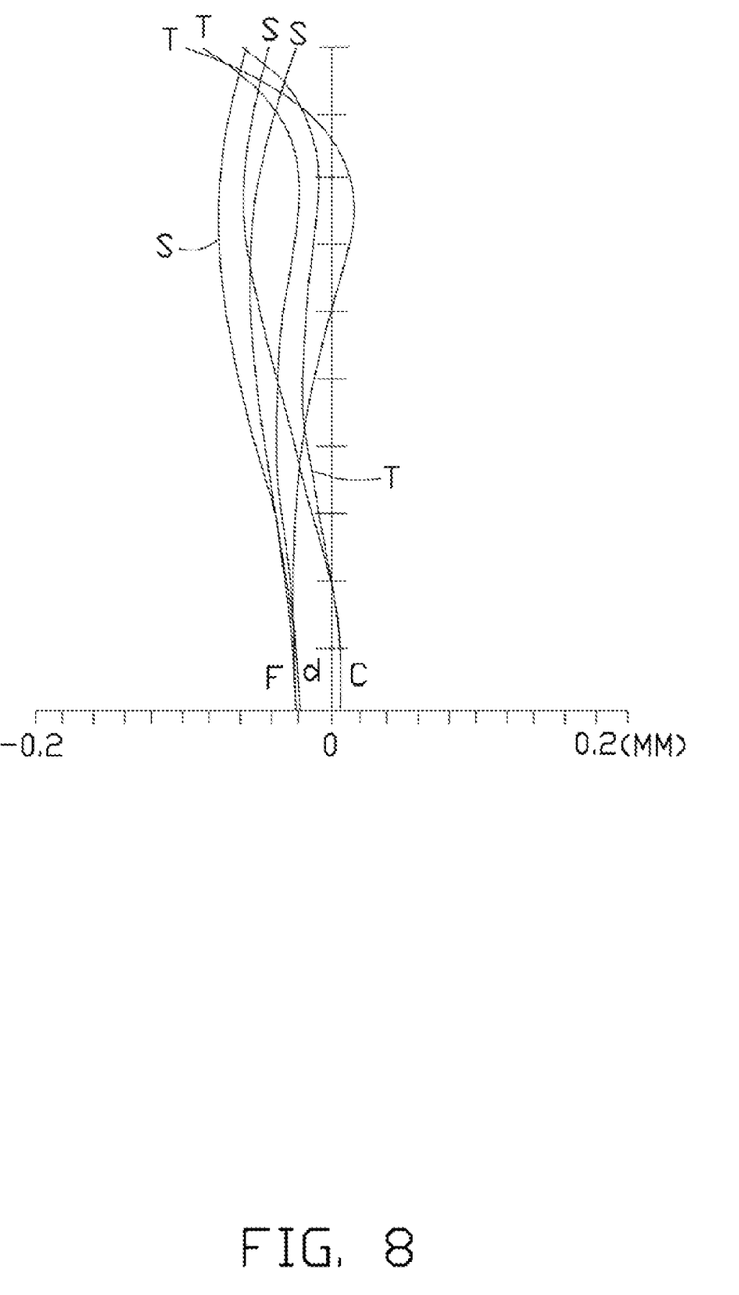
Figure 9:
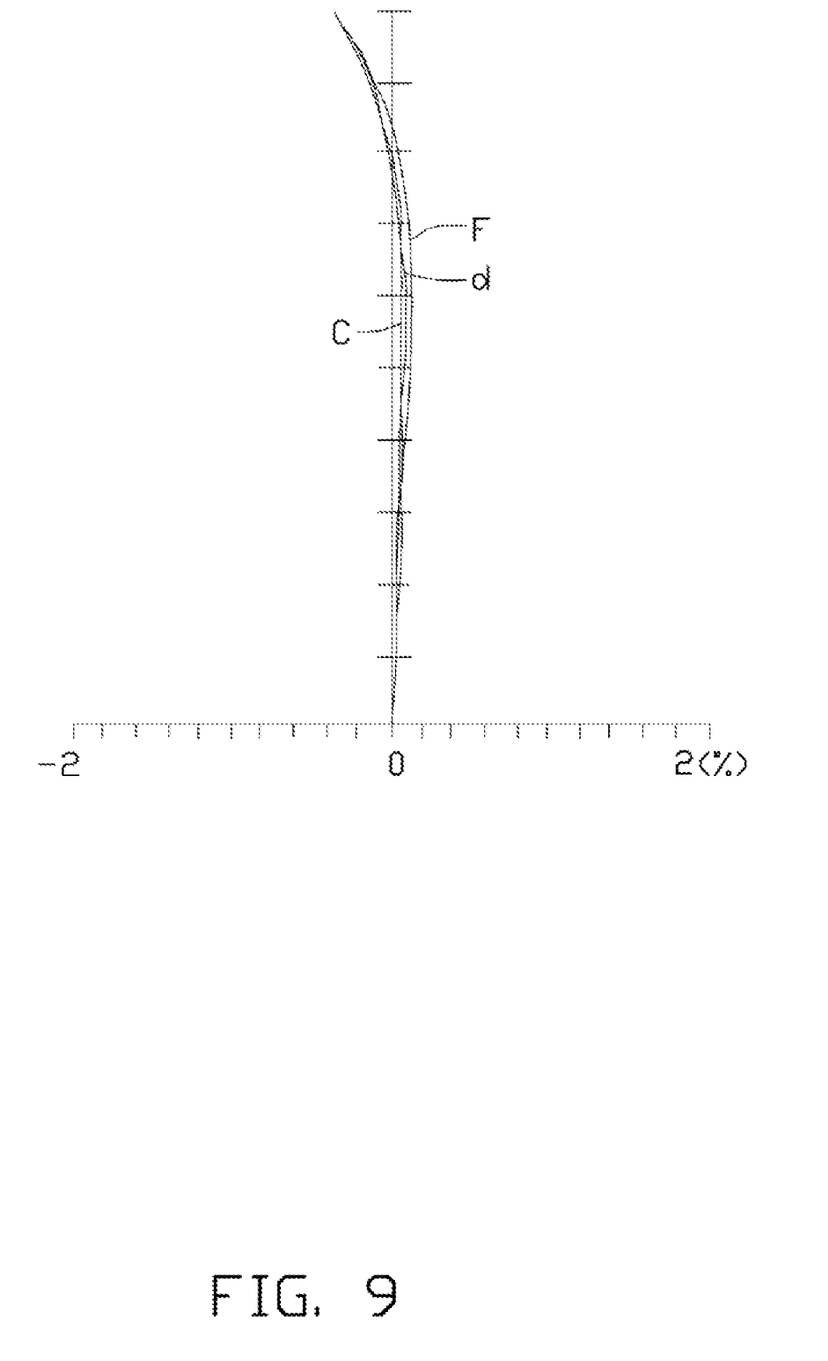
Figure 10:
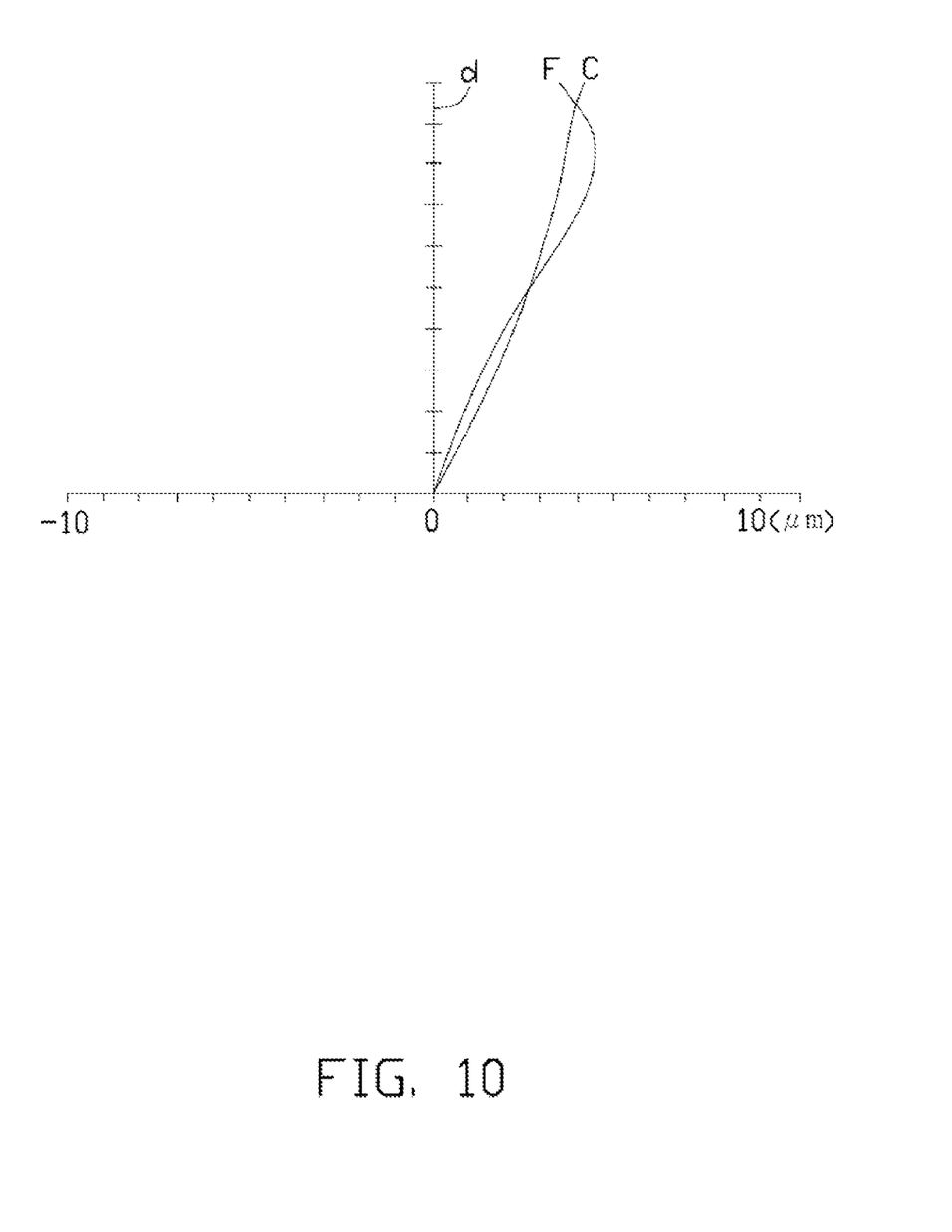

FIGS. 3-6, are graphs of aberrations (spherical aberration, field curvature, distortion, and lateral chromatic aberration) of the zoom projection lens 100 in a wide angle state. FIGS. 7-10, are graphs of aberrations (spherical aberration, field curvature, distortion, and lateral chromatic aberration) of the zoom projection lens 100 in a telephoto state. In FIGS. 3, 7, curves are spherical aberration characteristic curves of F light (wavelength: 486.1 nm), d light (wavelength: 587.6 nm) and C light (wavelength: 656.3 nm) of the zoom projection lens 100. The distortion of the zoom projection lens 100 is from −0.1% to 0.1% of visible light (wavelength: 400-700 nm). As illustrated in FIGS. 4, 8, the curves T and S are the tangential field curvature curve and the sagittal field curvature curve respectively. The field curvature of the zoom projection lens 100 is from −0.2 mm to 0.2 mm. As illustrated in FIGS. 5, 9, the distortion of the zoom projection lens 100 is from −1.5% to 1.5%. In FIGS. 6, 10, curves are lateral chromatic aberration characteristic curves of F light (wavelength: 486.1 nm), d light (wavelength: 587.6 nm) and C light (wavelength: 656.3 nm) of the zoom projection lens 100. The lateral chromatic aberration characteristic curve of d light is overlap with the vertical axis. The lateral chromatic aberration of the zoom projection lens 100 is from −10 μm to 10 μm of visible light.

Aberrations occurring in the zoom projection lens 100 are controlled/corrected to an acceptable level, and changes in aberrations are reduced to acceptable levels as well, over the entire zoom range of the zoom projection lens 100, accordingly, a high resolution of the zoom projection lens 100 is obtained, and maintained over the entire zooming range of the zoom projection lens 100.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A zoom projection lens, in the order from the magnification side to the minification side thereof, comprising:
   a first lens group with negative refraction power;
   a second lens group with positive refraction power;
   a third lens group with positive refraction power;
   a fourth lens group with negative refraction power; and
   a fifth lens group with positive refraction power;
   the first lens group, the second lens group, the third lens group, and the fourth lens group being movably positioned, the fifth lens group being immovably positioned, the zoom projection lens satisfying the formulae:

$1.0 < |F1/Fw| < 1.3$;

$2.5 < |F3/Fw| < 2.7$;

$2.81 < |F5/Fw| < 2.83$; and $0.21 < |F2/F4| < 0.24$;

wherein F1-F5 respectively represent the effective focal lengths of the first, second, third, fourth, and fifth lens groups, Fw represents the shortest effective focal length of the zoom projection lens.

2. The zoom projection lens as claimed in claim 1, wherein the first lens group comprises, in the order from the magnification side to the minification side of the zoom projection lens, a first lens with negative refraction power, a second lens with negative refraction power, the first lens and the second lenses are adhered together to form a compound lens.

3. The zoom projection lens as claimed in claim 1, wherein the first lens group is a focus lens group.

4. The zoom projection lens as claimed in claim 2, wherein the first lens is an aspherical lens made of plastic.

5. The zoom projection lens as claimed in claim 1, wherein the second lens group comprises, in the order from the magnification side to the minification side of the zoom projection lens, a third lens with positive refraction power, a fourth lens with positive refraction power, and a fifth lens with negative refraction power, the fourth lens and the fifth lenses are adhered together to form a compound lens.

6. The zoom projection lens as claimed in claim 5, wherein the third lens, the fourth lens, and the fifth lens are spherical lenses made of glass.

7. The zoom projection lens as claimed in claim 1, wherein the third lens group comprises, in the order from the magnification side to the minification side of the zoom projection lens, a sixth lens with positive refraction power; the fourth lens group comprises, in the order from the magnification side to the minification side of the zoom projection lens, a seventh lens with negative refraction power, a eighth lens with negative refraction power, a ninth lens with positive refraction power, and a tenth lens with positive refraction power, the eighth lens and the ninth lenses are adhered together to form a compound lens, the fifth lens group comprises an eleventh lens with positive refraction power.

8. The zoom projection lens as claimed in claim 7, wherein the sixth lens, the seventh lens, the eighth lens, the ninth lens, the tenth lens, and the eleventh lens are spherical lenses made of glass.

9. The zoom projection lens as claimed in claim 5, wherein the zoom projection lens further satisfies the formulae:

$1.6 < (Nd4+Nd5)/2$;

$40 < (Vd4-Vd5) < 46$;

where Nd4 is the refractive index of the fourth lens of d light with a wavelength of 587.6 nm, Vd4 is the Abbe number of the fourth lens of d light; Nd5 is the refractive index of the fifth lens of d light, Vd4 is the Abbe number of the fifth lens of d light.

10. The zoom projection lens as claimed in claim 1, wherein the half-field angle of the zoom projection lens is not smaller than 29 degrees.

11. The zoom projection lens as claimed in claim 5, wherein the zoom projection lens comprises an aperture stop is positioned between the second lens group and the third lens group.

12. The zoom projection lens as claimed in claim 11, wherein the aperture stop is positioned on a minification side surface of the fifth lens.

13. The zoom projection lens as claimed in claim 11, wherein the aperture stop has an unchangeable aperture.

* * * * *